United States Patent
Tomita et al.

(10) Patent No.: US 7,389,182 B2
(45) Date of Patent: Jun. 17, 2008

(54) ROUTE GUIDANCE METHOD, NAVIGATION APPARATUS, PORTABLE TERMINAL, AND INFORMATION SERVER

(75) Inventors: Hiroshi Tomita, Okazaki (JP); Kenji Nagase, Okazaki (JP)

(73) Assignee: Aisin Aw Co., Ltd. (JP)

( * ) Notice: Subject to any disclaimer, the term of this patent is extended or adjusted under 35 U.S.C. 154(b) by 392 days.

(21) Appl. No.: 11/091,343

(22) Filed: Mar. 29, 2005

(65) Prior Publication Data
US 2005/0240344 A1    Oct. 27, 2005

(30) Foreign Application Priority Data
Apr. 22, 2004   (JP)   ............................. 2004-127107

(51) Int. Cl.
*G01C 21/34*   (2006.01)
(52) U.S. Cl. .................. 701/211; 701/209; 340/995.19
(58) Field of Classification Search ........ 701/200–202, 701/23–26, 28, 209–211; 342/357.01, 357.09, 342/357.1; 340/988, 995.1, 991, 995.19
See application file for complete search history.

(56) References Cited

U.S. PATENT DOCUMENTS 5,187,810 A * 2/1993 Yoneyama et al. ......... 455/509

2004/0027258 A1   2/2004  Pechatnikov et al.

FOREIGN PATENT DOCUMENTS

| EP | 1 302 749 | 4/2003 |
| EP | 1 371 950 | 12/2003 |
| WO | 2004/059251 | 7/2004 |

* cited by examiner

*Primary Examiner*—Yonel Beaulieu
(74) *Attorney, Agent, or Firm*—Bacon & Thomas, PLLC

(57) ABSTRACT

A route guidance method provides route guidance from a current position to a destination by using a navigation apparatus capable of displaying a route from the current position to the destination in combination with a portable terminal carried by a user. The navigation apparatus produces a 2-dimensional code based on information associated with the destination and a location at which the user leaves his/her car en route to the destination and displays the thus produced code. The portable terminal acquires the information associated with the location at which the user leaves his/her car and the destination by reading the 2-dimensional code displayed by the navigation apparatus.

22 Claims, 14 Drawing Sheets

ROUTE GUIDANCE METHOD, NAVIGATION APPARATUS, PORTABLE TERMINAL, AND INFORMATION SERVER

INCORPORATION BY REFERENCE

The disclosure of Japanese Patent Application No. 2004-127107 filed on Apr. 22, 2004, including the specification, drawings and abstract thereof, is incorporated herein by reference in its entirety.

BACKGROUND OF THE INVENTION

1. Field of the Invention

The present invention relates to a route guidance method, a navigation apparatus, a portable terminal and an information server.

2. Description of the Related Art

In some cases, en route to a destination, a car is parked at a parking lot located close to the destination or a transportation station, and the remaining distance to the destination is traveled on foot or using a public transportation system. In such cases, a navigation system may provide route guidance for a route to the parking lot by indicating the route on a displayed map. For further guidance along the route from the parking lot to the destination, a portable terminal having a GPS capability and a route guidance capability may be used. However, use of such a portable terminal requires the user to perform complicated and troublesome operations to input information, associated with the destination, into the portable terminal when the user leaves the car.

With another device, when a destination is reached, a navigation apparatus is operated to store the destination as a registered point in a server as disclosed, for example, in Japanese Unexamined Patent Application Publication No. 2004-20304. After the destination has been registered, if the server detects that a user is leaving a car, the server transmits information to the user's portable terminal indicating a route from the user's car to the registered point (destination). When a destination is reached, it is necessary to operate the navigation apparatus mounted within the car to enter the destination as a registered point. Although this makes it unnecessary for a user to manually input destination information into the portable terminal, it is impossible to acquire route information via the portable terminal in a case in which the user leaves his/her car en route to the destination.

SUMMARY OF THE INVENTION

Accordingly, an object of the present invention is to provide a more convenient technique for providing route information to a user of a navigation apparatus and a portable terminal.

To solve the problems described above, the present invention provides a route guidance method for providing route guidance from a current position to a destination by use of a navigation apparatus capable of displaying a route from the current position to the destination and a portable terminal carried by a user, which method includes a step, performed by the navigation apparatus, for producing a code based on information associated with the destination and the current position en route to the destination and displaying the thus produced code, and steps, performed by the portable terminal, for acquiring code image information by capturing an image of the code displayed by the navigation apparatus and for providing route guidance to the destination based on the thus acquired code image information.

In this route guidance method, the navigation apparatus produces the code based on information associated with the destination and the current position en route to the destination and displays the produced code, and the portable terminal acquires code image information by capturing the image of the displayed code and provides route guidance to the destination based on the code image information. Thus, when a user leaves his car to walk to the destination or to use a public transportation system to reach the destination, the portable terminal can provide route guidance for a route from the current position to the destination based on the acquired information associated with the current position and the destination, even if the portable terminal does not have a position detection capability. A user can transfer at least information associated with the destination simply by capturing the code image from the display of the code without need for a troublesome operation inputting the information associated with the destination into the portable terminal, such as operation of keys.

The route guidance method may further include a step, performed by an information server connected to the portable terminal via a two-way communication line, for receiving code image information produced by capturing the image of the code with the portable terminal, and extracting information associated with the current position and the destination by analyzing the received code image information. This makes it possible for the portable terminal to extract the information associated with the current position and the destination without a capability for analyzing the image information.

In another embodiment the route guidance method further includes a step, performed by the portable terminal, for extracting information associated with the current position and the destination by analyzing the code image information obtained from the captured code image. This embodiment makes it unnecessary to use an external apparatus for analyzing the code.

The route guidance method may further include a step, performed by an information server, for searching for a route from the current position to the destination based on the extracted information associated with the current position and the destination, and transmitting information associated with the route. This makes it possible for the portable terminal to acquire route guidance information from the information server, without need for a searching capability.

In another embodiment, the route guidance method may further include a step, performed by the portable terminal, for searching for a route from the current position to the destination based on the extracted information associated with the current position and the destination. This embodiment makes it unnecessary to use an external apparatus to search for the route to the destination from the location at which the user leaves his/her car en route to the destination.

In yet another embodiment of the route guidance method the searching step is performed by the navigation apparatus. In this embodiment the navigation apparatus searches for a route from the current position to the destination based on the information associated with the current position and the destination, and incorporates information associated with the route into a code which is then displayed. In this route guidance method, the code produced by the navigation apparatus includes information associated with the route to the destination. This makes it possible to acquire the information associated with the route, from the current position to the destination, simply by analyzing the image information obtained by capturing the image of the code.

The route guidance method may further include a step, performed by an information server connected to the portable terminal via a two-way communication line, for producing information for a route or a running schedule of a transportation system, based on the extracted information associated with the current position and the destination and a step for transmitting the thus produced information to the portable terminal. This makes it possible to acquire information associated with a transportation system when the transportation system is to be used en route to the destination.

The route guidance method may further include a step, performed by the portable terminal or an information server connected to the portable terminal via a two-way communication line, for transmitting facility information associated with the current position or facility information associated with the destination to the portable terminal, based on the extracted information associated with the current position and the destination. This makes it possible for the portable terminal to acquire information about facilities located in the vicinity of the current position or the destination, without need for a position detection capability and without need for storage of facility information in a storage unit incorporated into the portable terminal.

The present invention also provides a navigation apparatus for displaying a route from a current position to a destination, which navigation apparatus includes code generation means for generating a code which includes information associated with the current position and the destination and whose image can be captured by a portable terminal, and a display screen for displaying the generated code on a display of the navigation apparatus.

In this navigation apparatus, the code, which is produced based on the information associated with the current position and the destination and whose image can be captured by a portable terminal, is displayed on a display screen of the navigation apparatus. Thus, in a case in which a user uses a portable terminal to acquire route guidance for a route from a parking location to the final destination, it is possible to transfer the information associated with the current position and the destination to the portable terminal by capturing the image of the code displayed on the navigation apparatus. This makes it possible for the portable terminal to acquire the information associated with the current position without need for a capability of detecting the current position and also makes it possible for the portable terminal to acquire the information associated with the destination simply by capturing the image of the code without need for re-input of the information associated with the destination.

The present invention also provides a portable terminal capable of obtaining information associated with a current position and a destination by transfer from a navigation apparatus. For this purpose the portable terminal includes an imaging unit for capturing, as image information, an image of a code, produced based on information associated with the current position and the destination and displayed on the screen of the navigation apparatus, and analysis means for extracting information associated with the current position and the destination by analyzing the captured code image information. This makes it possible for the portable terminal to acquire the information associated with the current position without need for capability of detecting the current position and also makes it possible for the portable terminal to acquire the information associated with the destination simply by capturing the image of the code without need for re-input of the information associated with the destination.

The present invention also provides an information server connected, via two-way communication, to a portable terminal carried by a user. In this embodiment, the information server includes analysis means for receiving code image information based on information associated with a current position and a destination and transmitted from the portable terminal, and for extracting information associated with the current position and the destination by analyzing the code image information. This makes it possible for the portable terminal to acquire the information associated with the current position and the destination without need for capability of analyzing the code, because the information server performs the analysis for the portable terminal.

DESCRIPTION OF THE PREFERRED EMBODIMENTS

First Embodiment

Figure 1:
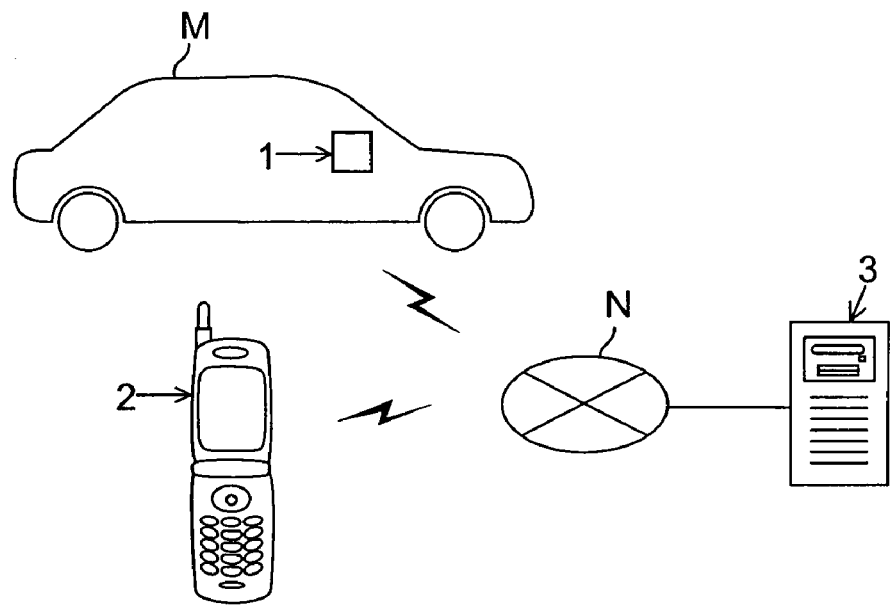
FIG. 1 is a schematic diagram of a route guidance system according to a first embodiment of the present invention.

A first embodiment of the invention is described with reference to FIGS. 1 to 9. As shown in FIG. 1, the route guidance system of the first embodiment includes a navigation apparatus 1 installed in a vehicle M, a portable terminal 2, and an information server 3 installed in an information center. The navigation apparatus 1 is connected to the server 3 via a network N that allows two-way data communication between the navigation apparatus 1 and the server 3. The portable terminal 2 is also connected to the server 3 via the network N for data communication therebetween.

Figure 2:
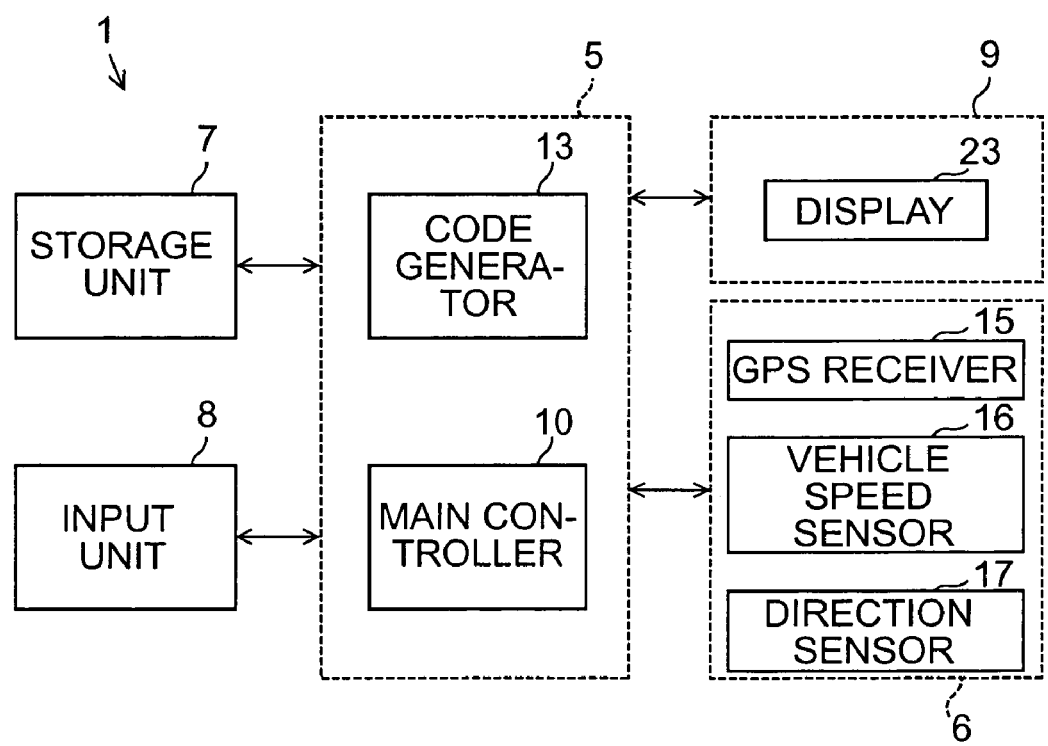
FIG. 2 is a block diagram of the electrical configuration of the navigation apparatus of the first embodiment.

Details of the navigation apparatus 1 are shown in FIG. 2. As shown in FIG. 2, the navigation apparatus 1 includes a controller 5, a position detection unit 6, a storage unit 7, an input unit 8, and an output unit 9.

The controller 5 includes a main controller 10 and a code generator 13 serving as code generation means. In accordance with a route guidance program, the main controller 10 executes various routines such as searching for a route from a current position to a destination and displaying the thus determined route. The main controller 10 also performs data communication with the server 3 in accordance with the route guidance program.

The code generator 13 generates a 2-dimensional code by coding a present position, a destination, a URL of the server 3 and authentification information. The generated 2-dimensional code output from the code generator 13 is supplied to the output unit 9.

The position detection unit 6 detects the present position of the vehicle M and includes a GPS receiver 15, a vehicle speed sensor 16, and a direction sensor 17.

The storage unit 7 stores various programs executed by the main controller 10 of the controller 5 or the code generator 13. For example, the programs include a program for data communication with the server 3, a program for displaying a map and route guidance information on the display 23 of the output unit 9, and a program for displaying the 2-dimensional code. The storage unit 7 also stores data such as destination data used to set a destination, and map data and road data used in route searching.

The input unit 8 is composed of switches or a remote controller. The input unit 8 is used to input various control signals to the controller 5 for setting of a destination, searching for a route, and route guidance. The output unit 9 includes a display unit 23 and a speaker. The display unit 23 is, for example, a liquid crystal display with a touch panel, and is used to display an image and various kinds of information produced as a result of the various routines and processing executed by the main controller 10 of the controller 5 or the code generator 13.

Figure 3:
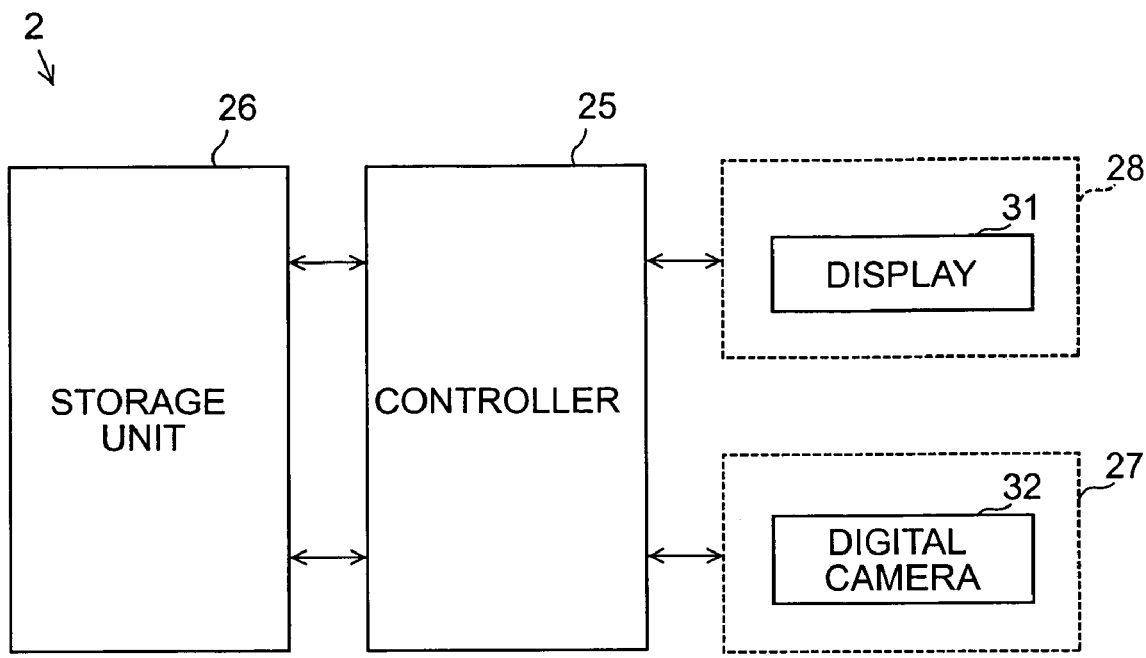
FIG. 3 is a block diagram of the electrical configuration of a portable terminal of a route guidance system according to the first embodiment.

The portable terminal 2 as shown in FIG. 3 is intended to be carried by a user. Specific examples of the portable terminal 2 include a portable telephone and a PDA device. The portable terminal 2 includes a controller 25, a storage unit 26, an input unit 27, and an output unit 28.

The controller 25 controls data transmission with the server 3. The storage unit 26 stores various kinds of programs including a browser program. The storage unit 26 also stores data received from the server 3 and data input via the input unit 27. The input unit 27 includes a digital camera 32 serving as an imaging unit and also includes an input button. The digital camera 32, for example, a CCD camera, is used for capturing an image of a 2-dimensional code displayed on the display unit 23 of the navigation apparatus 1. The output unit 28 includes a display unit 31 for displaying a map and an operation screen, and also includes a speaker.

Figure 4:
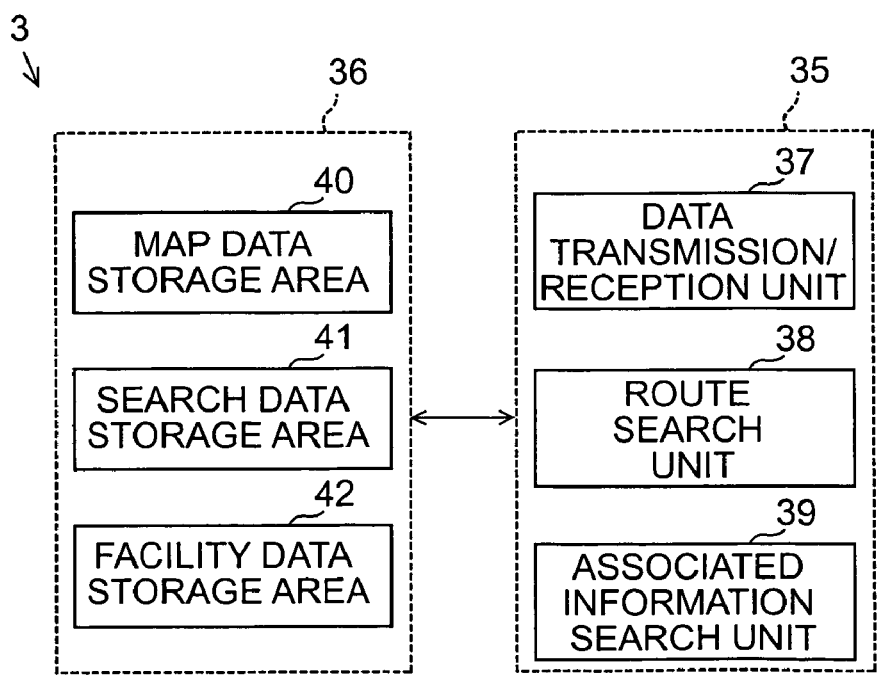
FIG. 4 is a block diagram of the electrical configuration of a server of the route guidance system according to the first embodiment.

Next, the server 3 located in the information center will be explained with reference to FIG. 4 which is a schematic diagram of the electrical configuration of the server 3. As shown in FIG. 4, the server 3 includes a controller 35 and a storage unit 36.

The controller 35 includes a data transmission/reception unit 37 serving as analysis means, a route search unit 38, and an associated information search unit 39. The data transmission/reception unit 37 provides data communication with the navigation apparatus 1 or the portable terminal 2. The route search unit 38 searches for a route from a current position to a destination, based on position information associated with the current position and the destination received from the navigation apparatus 1. If the route determined by the search includes a public transportation system, the route search unit 38 searches for a public transportation line to be used.

The associated information search unit 39 searches for associated information such as information for facilities at particular points and/or train schedules (timetable information), responsive to signals received from the navigation apparatus 1 or the portable terminal 2. The information obtained by the route search unit 38 and associated with the route from the current position to the destination and the facility information obtained by the associated information search unit 39 are transmitted by the data transmission/reception unit 37 to the portable terminal 2.

The storage unit 36 of the server 3 stores the route guidance program used to analyze two-dimensional codes. The storage unit 36 includes a map data storage unit 40, a search data storage unit 41, and a facility data storage unit 42. The map data storage unit 40 stores map data used to display a map on the display unit 31 of the portable terminal 2. The search data storage unit 41 stores data including road data and node data used in searching for the shortest route between two points, e.g., between the detected or input current position and a destination. The search data storage unit 41 also stores train schedules and other information for public transportation systems. The facility data storage unit 42 stores information associated with facilities such as hospitals and schools located in various areas.

A route guidance method according to an embodiment of the invention will now be described, with reference to FIGS. 5 to 9.

Figure 5:
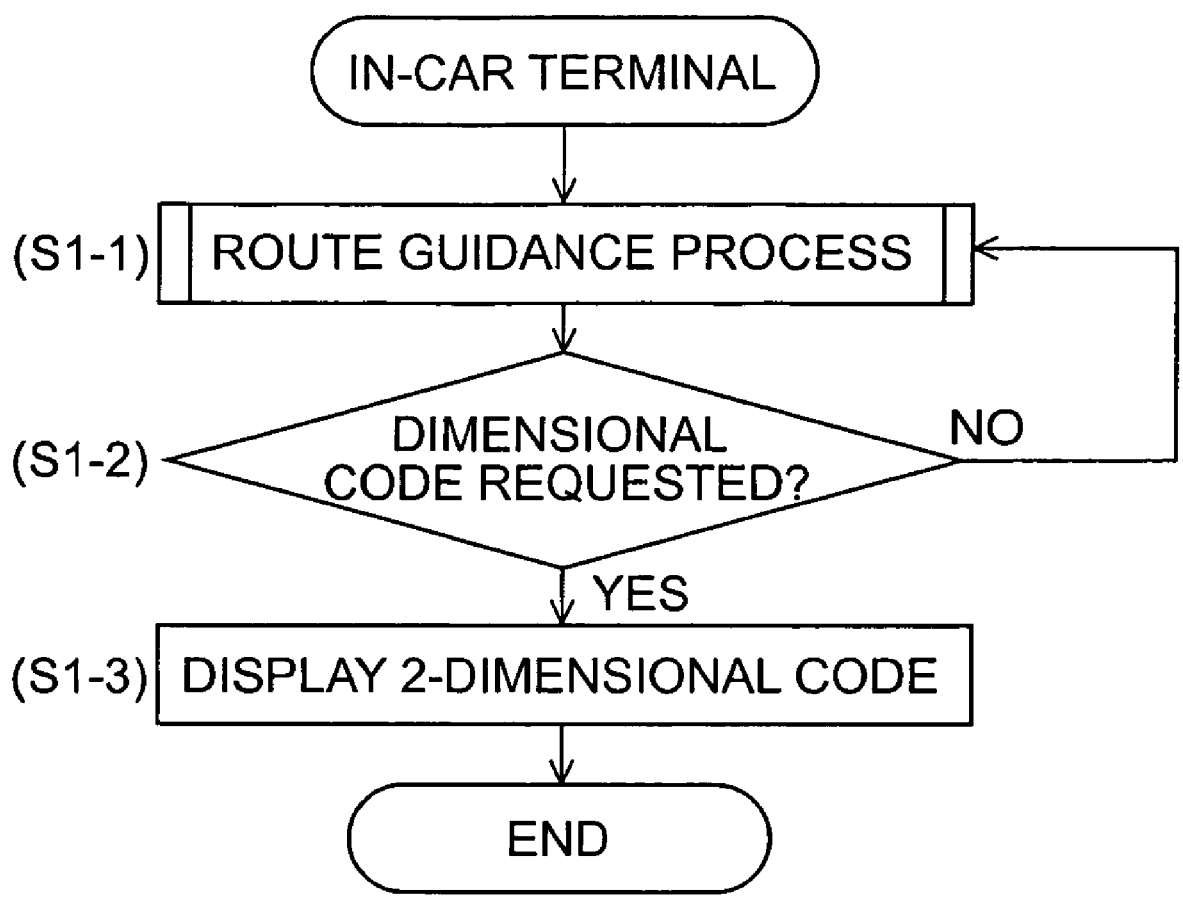
FIG. 5 is a flow chart of a routine executed by the navigation apparatus in accordance with the first embodiment.

Assuming that the navigation apparatus 1 is currently providing route guidance by displaying a route from a current position to a destination on the display unit 23, the navigation apparatus 1 operates as follows. Referring to FIG. 5, in step S1-1 the navigation apparatus 1 (the controller 5) executes a route guidance program to provide route guidance from the current position to the destination by displaying a map of an area around the current position on the display unit 23. When a user parks vehicle M in a parking lot or other parking location en route to the destination and leaves the vehicle M, the user operates a switch on the input unit 8 of the navigation apparatus 1 to display a setting screen G1 as shown in FIG. 6 for transferring information associated with the destination on the display unit 23.

Figure 6:
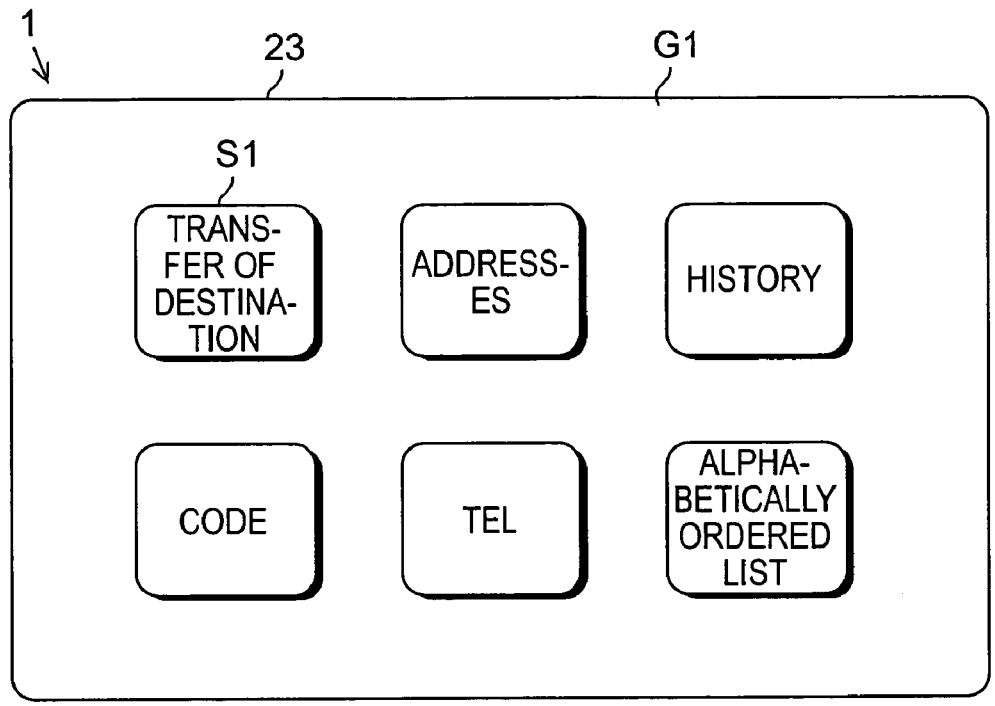
FIG. 6 is a diagram showing an example of a screen display of a navigation apparatus of the first embodiment.
Figure 7:
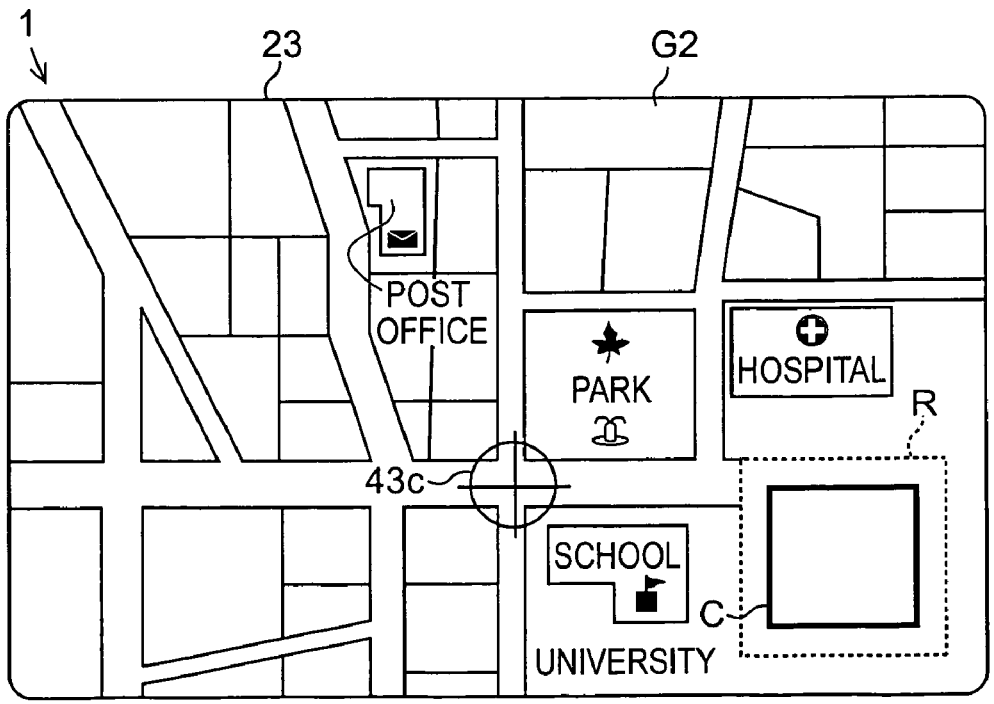
FIG. 7 is a diagram of another screen display according to the first embodiment.

As shown in FIG. 6, the setting screen G1 includes an address setting button, a history button, and a destination transfer button S1. When a user touches the destination transfer button S1 on the setting screen G1, the navigation apparatus 1 (the controller 5) determines that a destination transfer command has been issued (step S1-2 is answered affirmatively), the navigation apparatus 1 produces a 2-dimensional code by the code generator 13 and displays the generated 2-dimensional code on the display unit 23 (step S1-3). The 2-dimensional code C is displayed, as shown in FIG. 7, in a display area R in the lower right corner of the display unit 23 on which the map is also displayed.

The 2-dimensional code C includes coded information associated with the current position and the destination set by the user in the navigation apparatus 1. The 2-dimensional code C can include a large amount of information in a small area and can be read from an arbitrary direction. When the 2-dimensional code C is generated as described above, the information associated with the current position is given by the position detection unit 6, and the information associated with the destination is read from the storage unit 7. The 2-dimensional code C displayed also includes coded information associated with the URL of the server 3 of the information center and authentication information needed to access the server 3. The information associated with the URL and the authentication information represented in the 2-dimensional code C are acquired from the storage unit 7.

When the 2-dimensional code displayed on the navigation apparatus 1 is read (captured) by the portable terminal 2, the tasks of the navigation apparatus 1 are completed and electric power thereto is turned off.

Next, the operation of the portable terminal 2 will be explained with reference to FIG. 8.

When the 2-dimensional code C is displayed on the display unit 23 of the navigation apparatus 1, the user captures the image of the 2-dimensional code C using the digital camera 32 of the portable terminal 2 (step S1-4). The controller 25 temporarily stores the captured 2-dimensional code as image data (image information) in the storage unit 26. In response to an input command (operation by the user), the controller 25 transmits the image data of the 2-dimensional code stored in the storage unit 26 to the server 3 (step S1-5).

After the transmission of the image data of the 2-dimensional code, the portable terminal 2 (the controller 25) waits for route guidance information to be transmitted, in response to the image data, from the server 3 (step S1-6). More specifically, in accordance with information indicated by the image data (the 2-dimensional code), the server 3 transmits route guidance information or error information to the portable terminal 2. Depending on the situation, the route guidance information includes route information and train schedule information (timetable information) or includes only route information. If the server 3 receives image data (2-dimensional code) from an unauthorized portable terminal, the server 3 transmits, to that portable terminal, an error message indicating that the portable terminal is not allowed to receive route guidance.

Figure 9:
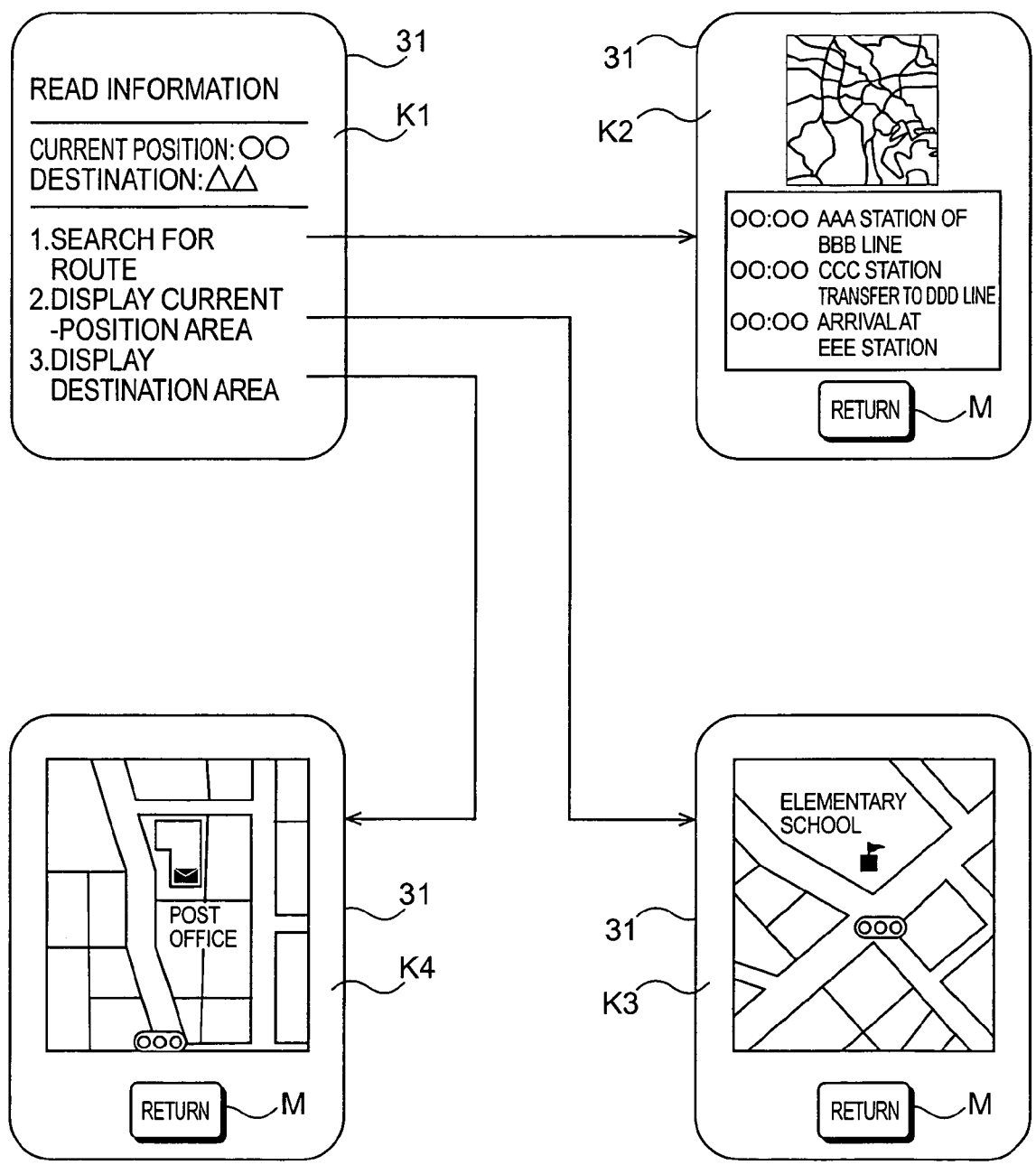
FIG. 9 shows additional examples of screens displayed on a portable terminal according to the first embodiment.

When the portable terminal 2 receives the route guidance information from the server 3 (that is, if step S1-6 is answered affirmatively), the portable terminal 2 (the controller 25) displays the route guidance from the current position to the destination on the display unit 31. If the route guidance information received from the server 3 includes schedule information for a public transportation system to be used en route to the destination, this schedule information is also displayed on the display unit 31 (step S1-7a). More specifically, when the portable terminal 2 (the controller 25) receives route information and train schedule information, the portable terminal 2 (the controller 25) first displays a menu screen K1 on the display unit 31 as shown in FIG. 9. The name of the current position and the name of the destination are displayed on the menu screen K1. The menu screen K1 also displays "Search for route", "Display current-position area", and "Display destination area" buttons, which are selectable by pressing. As shown in FIG. 9, if "Search for route" is selected, the portable terminal 2 (the controller 25) displays a route display screen K2. If "Display current-position area" is selected, a current-position area map screen K3 is displayed. If "Display destination area" is selected, a destination area map screen K4 is displayed.

On the route display screen K2, a route guidance map from the current position to the destination is displayed. In the case in which a public transportation system is to be used en route to the destination, a departure station and a departure time table, a transfer station and a transfer time table, and an arrival station and an arrival time table are also displayed. The current-position area map screen K3 presents a map of an area in the vicinity of the current position. Likewise, the destination area map screen K4 displays a map of an area in the vicinity of the destination. The user can easily reach the destination in accordance with information displayed on the screens K2 to K4. In the case in which a public transportation system is to be used, the user can easily determine by what time it is necessary to reach the departure station, based on the displayed information associated with the departure station and the departure times, the transfer station and the transfer time table, and the arrival station and the arrival time table.

If the route guidance information received in step S1-6 includes only route information, i.e., without the above-described schedule information, the portable terminal 2 (the controller 25) displays, for route guidance, a map of the route from the current position to the destination (step S1-7b). More specifically, the portable terminal 2 (the controller 25) displays the menu screen K1, the route display screen K2, the current-position area map screen K3, and the destination area map screen K4 similar to those shown in FIG. 9, except that train schedule information is not displayed on the route display screen K2. Thus, the user can easily reach the destination in accordance with information displayed on the screens K2 to K4.

In a case in which an error message is received in step S1-6, the portable terminal 2 (the controller 25) displays, on the display unit 31, a message indicating that display of route guidance is not allowed (step S1-7c).

Figure 8:
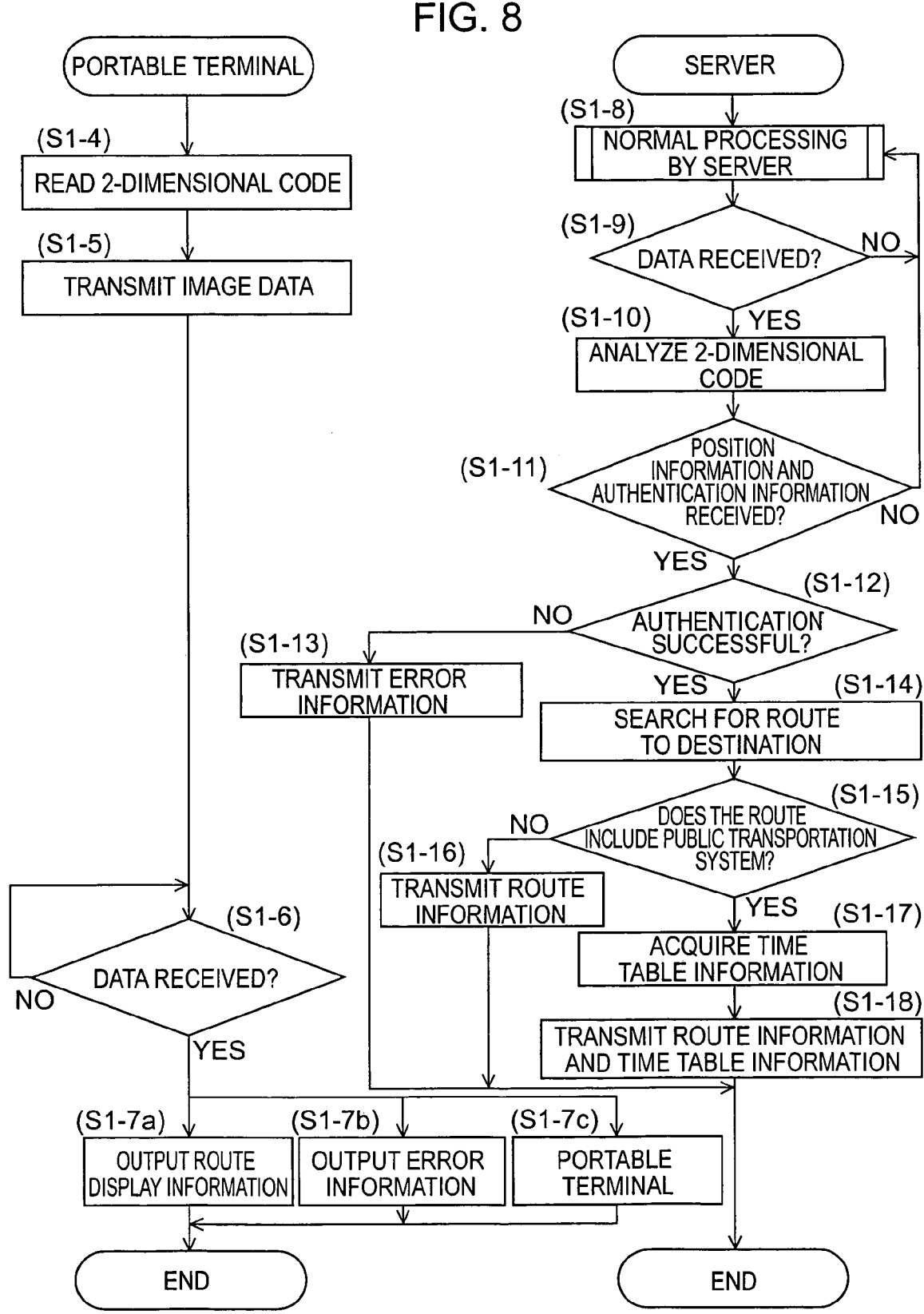
FIG. 8 is a flow chart of a routine executed by the portable terminal and information server according to the first embodiment.

In operation of the server 3, as shown in FIG. 8, the server 3 waits for receipt of the data from the image of the 2-dimensional code transmitted from the portable terminal 2, while performing normal processing (steps S1-8 and S1-9). When the image data is received (if step SI-9 is answered affirmatively), the data transmission/reception unit 37 of the server 3 analyzes the 2-dimensional code included in the received image data (step S1-10). More specifically, the data transmission/reception unit 37 extracts information associated with the current position, information associated with the destination, and authentication information needed to access the server 3, from the image data of the 2-dimensional code.

If the data transmission/reception unit 37 can extract neither information associated with the current position and the destination (position information) nor the authentication information needed to access the server 3 (that is, if step S1-11 is answered negatively), the data transmission/reception unit 37 of the server 3 resumes normal processing (step S1-8) and waits for arrival of the image data of a 2-dimensional code to be transmitted from the portable terminal 2 (step S1-9).

If information associated with the current position and the destination (position information) and authentication information are successfully extracted from the image data (that is, if step S1-11 is answered affirmatively), the data transmission/reception unit 37 compares the extracted authentication information with pre-registered authentication information (step S1-12). More specifically, the data transmission/reception unit 37 verifies the received authentication information by comparing it with user information stored in a user information storage unit (not shown). If the authentication is unsuccessful (step S1 -12 is answered negatively), the data transmission/reception unit 37 transmits an error message to the portable terminal 2 (step S1-13).

On the other hand, if the authentication is successful (step S1-12 is answered affirmatively), the server 3 searches for a route from the current position (car parking location) to the destination, based on the extracted information associated with the current position and the destination (step S1-14). More specifically, the route search unit 38 of the server 3 produces optimum route information indicating an optimum route from the current position (car parking location) to the destination based on search data stored in the search data storage unit 41. The route search unit 38 extracts map data (map information) from the map data storage unit 40 based on the optimum route information, and produces route information for display of a map with the optimum route shown thereon.

The route search unit 38 then examines the optimum route information to determine whether a public transportation system is to be used en route. (step S1-15). If it is determined that no public transportation system is available for use en route to the destination (step S1-15 is answered negatively), the server 3 (the data transmission/reception unit 37) transmits the optimum route information as route information to the portable terminal 2 (step S1-16).

On the other hand, if it is determined that a public transportation system is to be used en route to the destination (step S1-15 is answered affirmatively), the associated information search unit 39 of the server 3 acquires train schedule data or other transportation schedule data (step S1-17). More specifically, the associated information search unit 39 reads information from the search data storage unit 41 of the server 3 and produces information associated with routes (lines) of the public transportation system, such as a train system. The associated information search unit 39 reads train schedule information from a train schedule storage unit (not shown) of the server 3 and produces a train schedule table (indicating a departure station, a departure time, an arrival station, and an arrival time (and also a transfer station and a transfer time, if transfer is necessary)). The data transmission/reception unit 37 transmits the train schedule information including the train line information and the train schedule table together with the route information to the portable terminal 2 (step S1-18).

Summarizing, in the first embodiment, the navigation apparatus 1 produces a 2-dimensional code based on information (position information) associated with a car parking spot and a destination, and displays the thus produced 2-dimensional code on the display unit 23. The portable terminal 2 reads the displayed 2-dimensional code by capturing an image of the 2-dimensional code using the digital camera 32 and transmits the image data to the server 3. The server 3 extracts the position information by analyzing the received image data. The server 3 searches for a route from the car parking spot to the destination based on the extracted position information, and transmits route guidance information indicating the detected route to the portable terminal 2.

Thus, in a case in which a user leaves his/her vehicle M en route to the destination, and walks or uses public transportation to reach the destination, the user can acquire information associated with the route from the car parking spot to the destination via the portable terminal 2, even if the portable terminal 2 does not have a position detection capability using a GPS or the like, does not have a route searching capability, and does not have a 2-dimensional code analysis capability. Further, the user need not operate input buttons or the like to input information associated with the destination into the portable terminal 2. This provides a great convenience to the user.

Second Embodiment

A second embodiment of the present invention will now be described with reference to FIG. 10. The second embodiment is similar to the first embodiment except for some modification in processing. In the following description of the second embodiment, features similar to those of the first embodiment are denoted by the same reference numerals, and the explanation is focused on the what is different from the first embodiment.

In the second embodiment, the controller 25 (analysis means) of the portable terminal 2 analyzes the image data of the 2-dimensional code. Thus, the data transmission/reception unit 37 of the server 3 does not analyze the image data of the 2-dimensional code.

Figure 10:
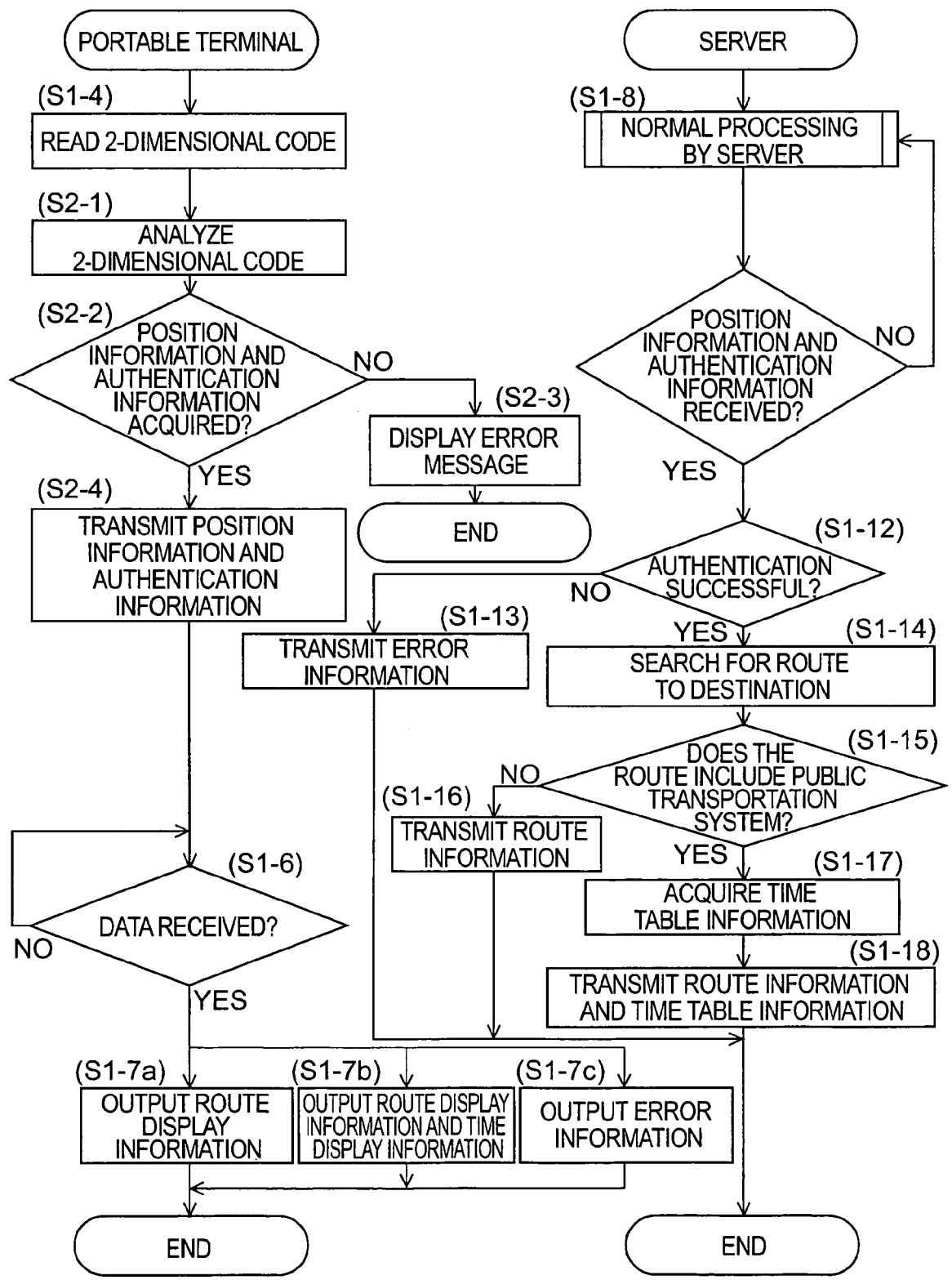
FIG. 10 is a flow chart of a routine executed in accordance with the method of a second embodiment.

Referring to FIG. 10, in step Si-4, when an image of a 2-dimensional code is captured using the digital camera 32 of the portable terminal 2, the controller 25 temporarily stores the captured 2-dimensional code as image data in the storage unit 26. The controller 25 analyzes the 2-dimensional code included in the captured image data (step S2-1). That is, the controller 25 extracts information (position information) associated with a current position and a destination and authentication information needed to access the server 3, from the image data of the 2-dimensional code.

If the controller 25 can extract neither position information nor authentication information needed to access the server 3 (the answer in step S2-2 is negative), the controller 25 displays an error message on the display unit 31 (step S2-3). On the other hand, if position information and authentication information are successfully extracted from the image data (the answer in step S2-2 is affirmative), the controller 25 transmits the extracted position information and authentication information to the server 3 (step S2-4). Thereafter, as in the first embodiment, the portable terminal 2 (the controller 25) waits for receipt of transmitted route guidance information, in response to the image data (the 2-dimensional code), from the server 3 (step S1-6).

The server 3 waits for receipt of the position information and the authentication information transmitted from the portable terminal 2 (step S2-5). When position information and authentification information are received (the answer in step S2-5 is affirmative), the data transmission/reception unit 37 executes a routine similar to that of the first embodiment (steps S1-12 to S1-18) to produce route guidance information or error information and transmits the thus produced information to the portable terminal 2.

Summarizing, in the second embodiment, the navigation apparatus 1 produces a 2-dimensional code based on location information associated with a current location (a car parking location) and a destination, and displays the thus produced 2-dimensional code on the display unit 23. The portable terminal 2 reads the displayed 2-dimensional code by capturing the image of the 2-dimensional code using the digital camera 32 and analyzes the image data (the 2-dimensional code). The portable terminal 2 extracts the location information from the 2-dimensional code and transmits the extracted location information to the server 3. The server 3 searches for a route from the car parking location to the destination based on the location information received from the portable terminal 2 and transmits route guidance information to the portable terminal 2.

Thus, in a case in which a user leaves his/her vehicle M en route to the destination, and travels on foot or by public transportation to reach the destination, the user can acquire information associated with the route from the car parking location to the destination via the portable terminal 2, even if the portable terminal 2 has neither a position detection capability using a GPS or the like nor a route searching capability. The user does not need to operate input buttons or the like of the portable terminal 2 to input information associated with the destination. This provides great convenience to the user. The server 3 does not need to analyze the image data (the 2-dimensional code), and thus the processing burden imposed on the server 3 is reduced.

Third Embodiment

A third embodiment of the present invention will now be described below with reference to FIGS. 11 and 12. The third embodiment is similar to the second embodiment except for some modifications in the configuration of the portable terminal 2 and in the routine executed by the portable terminal 2. In the following explanation of the third embodiment, components similar to those of the second embodiment are denoted by the same reference numerals, and the explanation is focused on the those features different from the first embodiment.

This third embodiment differs from the second embodiment in that route guidance information is produced, not by the server 3, but by the portable terminal 2. To this end, the portable terminal 2 stores map data, search data and facility data in its storage unit, and the controller 25 has the capability of searching for a route from the current position to a destination and the capability of searching for facilities located in various areas along the thus determined route. Furthermore, the controller 25 of the portable terminal 2 has the capability of analyzing the 2-dimensional code by communicating with the navigation apparatus 1.

A route guidance method according to the third embodiment of the invention will now be described below with reference to FIGS. 11 and 12.

Figure 11:
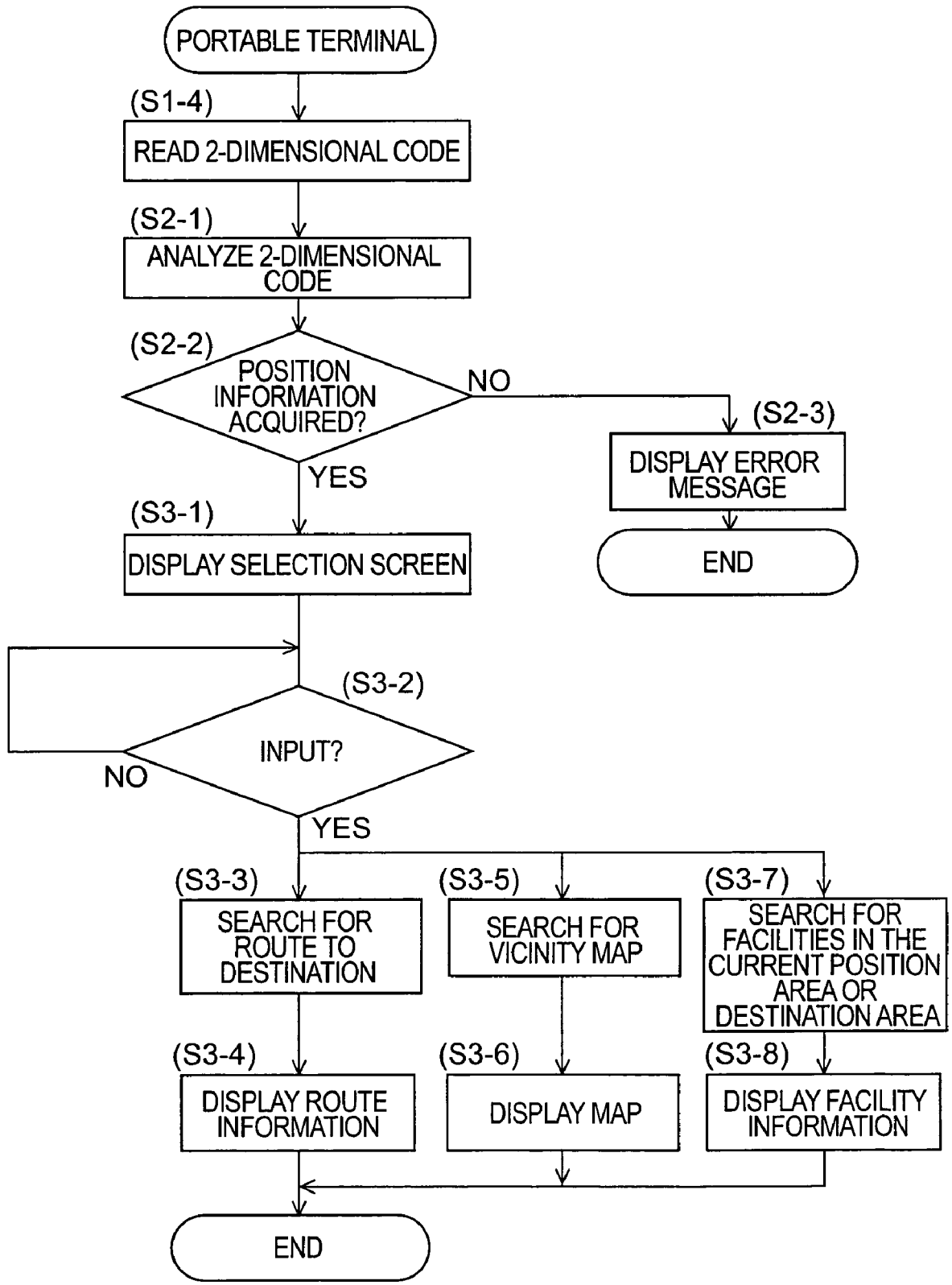
FIG. 11 is a flow chart of a routine executed in accordance with the method of a third embodiment.

Referring to FIG. 11, in step S1-4, when an image of a 2-dimensional code is captured using the digital camera 32 of the portable terminal 2, the controller 25 temporarily stores the captured 2-dimensional code as image data in the storage unit 26. The controller 25 analyzes the 2-dimensional code included in the captured image data (step S2-1). That is, the controller 25 extracts information ("location" or "position") associated with a current position and a destination from the image data of the 2-dimensional code. Note that in the present embodiment the 2-dimensional code does not include authentication information for access to the server 3, because no data from the server 3 is necessary.

Figure 12:
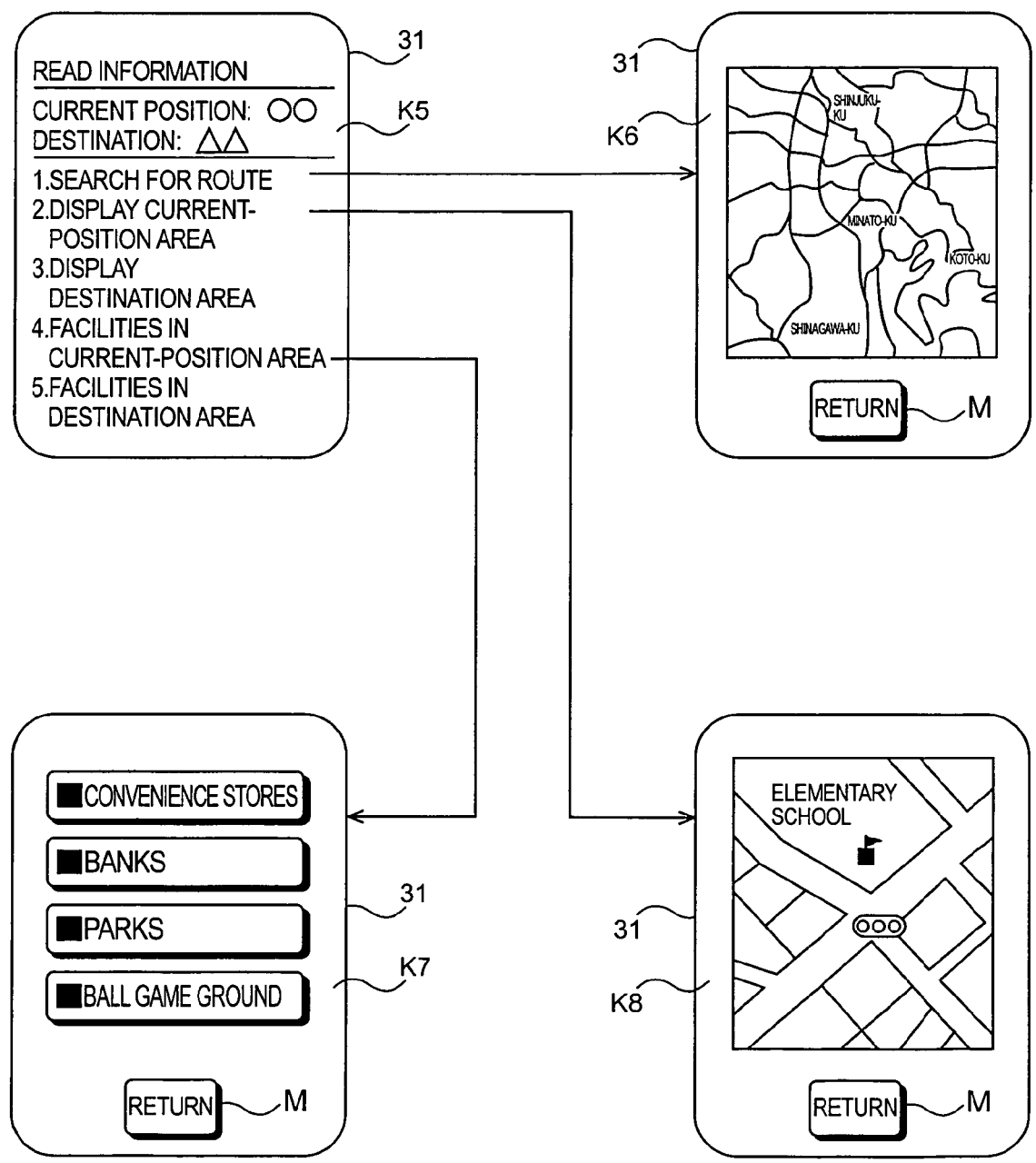
FIG. 12 shows examples of screens displayed on the portable terminal in accordance with the third embodiment.

If position information is extracted from the image data (step S2-2 is answered affirmatively), the controller 25 displays a menu screen K5 on the display unit 31 as shown in FIG. 12, and waits for a selection from the menu (steps S3-1 and 3-2). The "current position" and the "destination" extracted from the 2-dimensional code are displayed on the menu screen K5. Furthermore, the menu screen K5 also includes a "Search for route" button, a "Display current-position area" button, and a "Display destination area" button.

If the "Search for route" button is selected on the menu screen K5 (step S3-2 is answered affirmatively), the controller 25 searches for an optimum route from the current position to the destination utilizing the search data stored in the storage unit 26 (step S3-3). Based on optimum route information obtained as a result of the searching, the controller 25 retrieves map information for the optimum route from map data stored in the storage unit 26, and the controller 25 displays the optimum route on the display unit 31 of the portable terminal 2 (step S3-4). More specifically, a map screen K6 such as that shown in FIG. 12 is displayed on the display unit 31, and a map of a relative wide area showing the route from the car parking location to the destination is displayed on the map screen K6.

If the "Display current-position area" button or the "Display destination area" button is selected on the menu screen K5 (step S3-2 is answered affirmatively), the controller 25 searches for map data associated with the current position or the destination based on the extracted position information (step S3-5).

The controller 25 displays a map on the display unit 31 (step S3-6). That is, a display screen K8 is displayed on the display unit 31 and a map of an area in the vicinity of the current position (the car parking location) or an area in the vicinity of the destination is displayed on the display screen K8 as shown in FIG. 12.

On the other hand, if "Facilities in current position area" or "Facilities in destination area" is selected on the menu screen K5 (step S3-2 is answered affirmatively), the controller 25 first displays a facility category selection screen K7, as shown in FIG. 12. The controller 25 then searches for facilities associated with the current position or the destination based on a facility category selected from the menu presented on the facility category selection screen K7 and the extracted position information (step S3-7). The controller 25 displays information indicating detected facilities on the display unit 31 (step S3-8).

The user can then travel in accordance with the map and the facility information displayed on the display unit 31 of the portable terminal 2.

Summarizing, in the third embodiment, the navigation apparatus 1 produces a 2-dimensional code based on position information and displays the thus produced 2-dimensional code on the display unit 31. The portable terminal 2 reads the displayed 2-dimensional code by capturing the image of the 2-dimensional code using the digital camera 32 and analyzes the image data. Based on data obtained as a result of the analysis, the portable terminal 2 searches for a route from the current position (car parking location) to the destination, a map of an area in the vicinity of the car parking location or in the vicinity of the destination, and facilities. Based on information obtained by the search, a screen with the map and facility information is displayed on the display unit 31 of the portable terminal 2.

Thus, if a user leaves his car en route to the destination, and walks or uses a public transportation system to reach the destination, the user can acquire information associated with the route from the car parking location to the destination via the portable terminal 2, even if the portable terminal 2 has no position detection capability using a GPS or the like. The user need not operate input buttons or the like of the portable terminal 2 to input information associated with the destination, which is a great convenience to the user. Because the portable terminal 2 has a route search capability, the user can acquire information associated with the route from the current position (car parking location) to the destination by using the portable terminal 2 even in a poor communication environment.

Fourth Embodiment

A fourth embodiment of the present invention will now be described with reference to FIGS. 13 and 14. The fourth embodiment is similar to the third embodiment except for modifications in the configuration of the navigation apparatus 1 and in the processing performed by the navigation apparatus 1. In this explanation of the fourth embodiment, components similar to those of the third embodiment are denoted by the same reference numerals, and the explanation focuses on what is different from the third embodiment.

Figure 13:
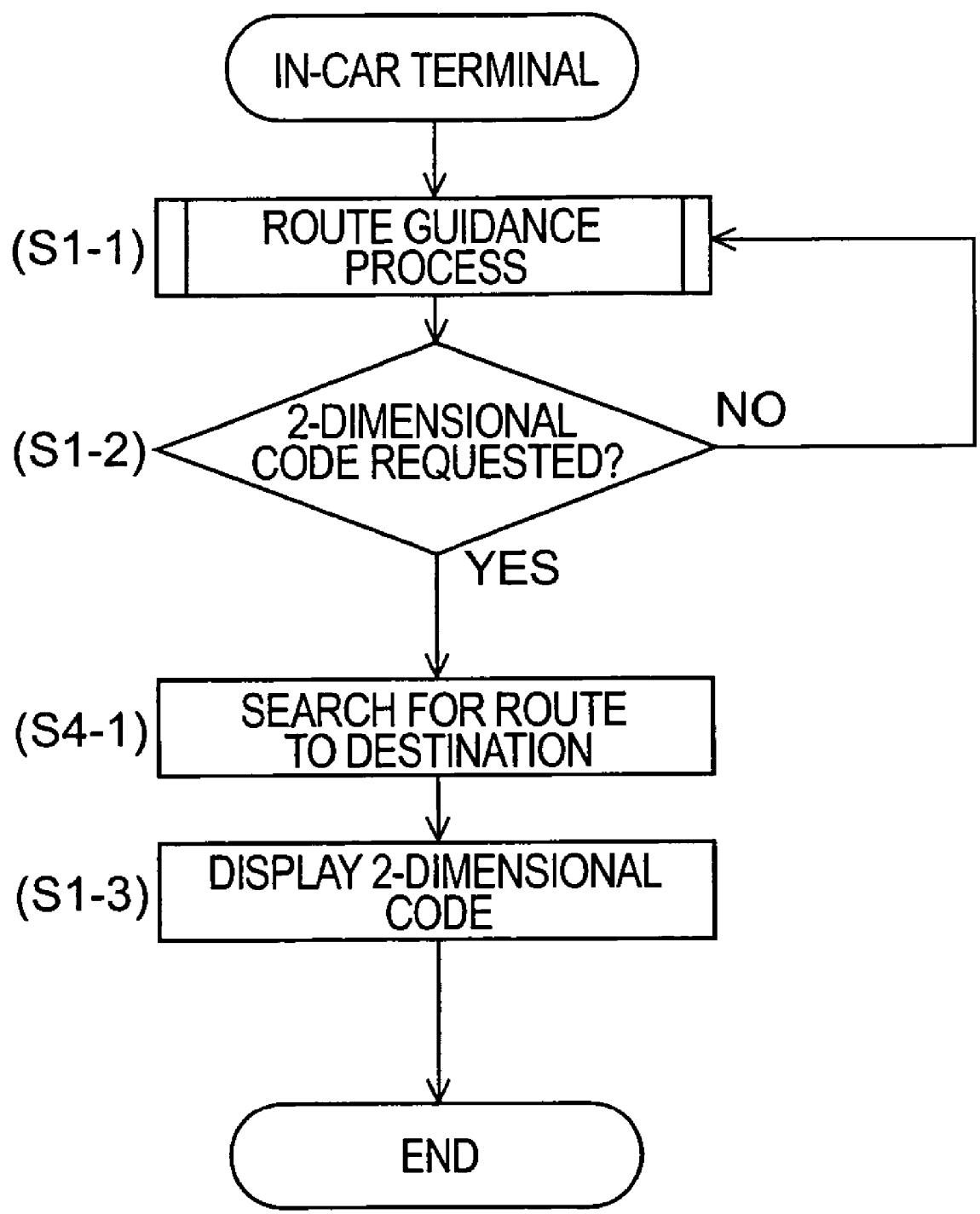
FIG. 13 is a flow chart of a routine executed by the in-car navigation apparatus in accordance with a fourth embodiment of the present invention.

In this fourth embodiment, as shown in FIG. 13, the main controller 10 of the navigation apparatus 1 searches for a route from the current position (a car parking spot) to a destination, based on search data and map data stored in the storage unit 7 (step S4-1). The main controller 10 produces a 2-dimensional code based on optimum route information obtained by this searching and further based on information associated with the location of the parking place and the destination.

The main controller 10 displays the thus produced 2-dimensional code on the display unit 23 (step S1-3). The 2-dimensional code produced by the code generator 13 of the navigation apparatus 1 includes information associated with the current position, the destination, and the optimum route.

Figure 14:
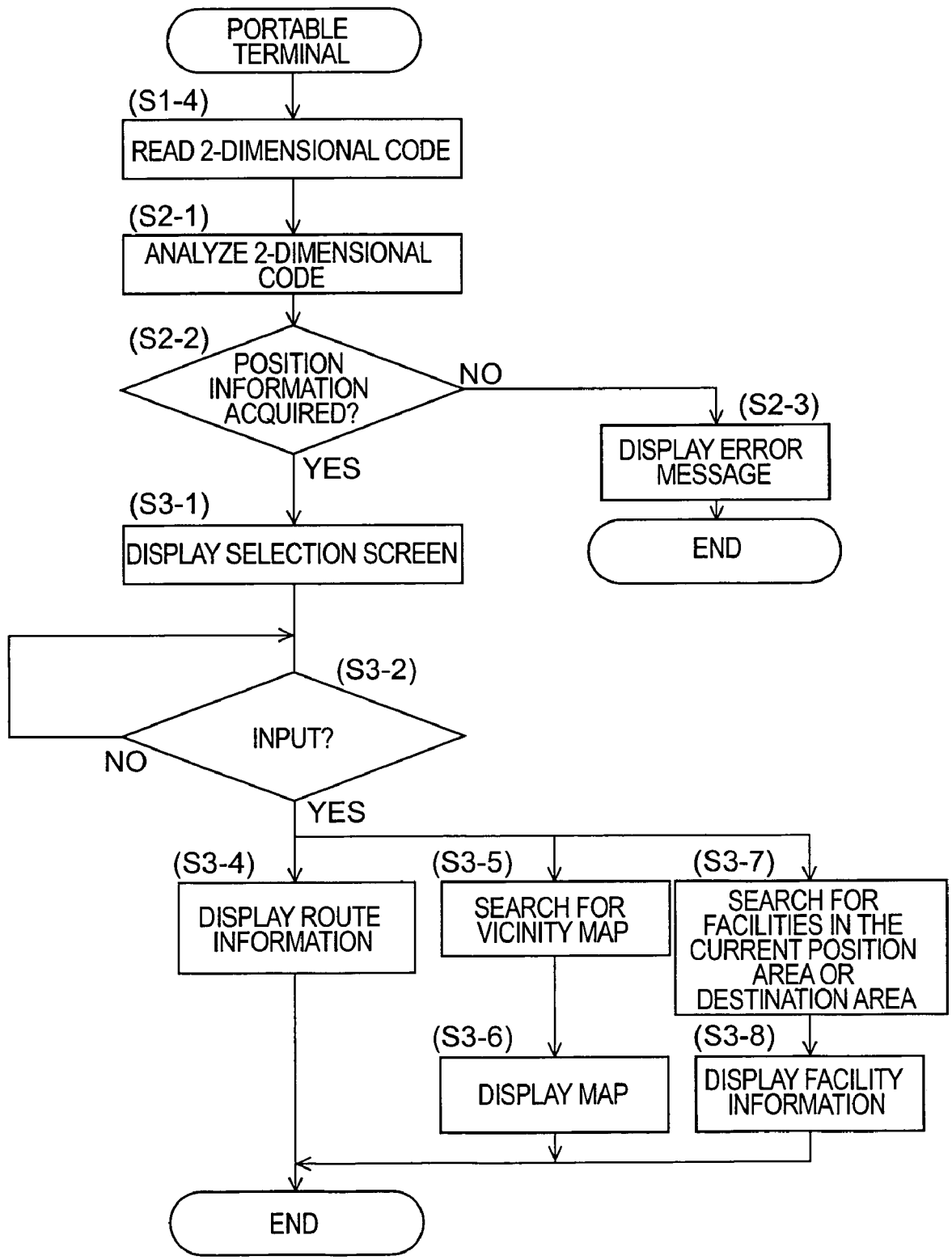
FIG. 14 is a flow chart showing a routine executed by the portable terminal in accordance with the fourth embodiment.

As shown in FIG. 14, the portable terminal 2 stores at least facility data in the storage unit 26. The portable terminal 2 captures the display of the 2-dimensional code displayed on the display unit 23 of the navigation apparatus 1 through use of digital camera 32 (step S1-4). The controller 25 of the portable terminal 2 analyzes image data obtained by capturing the 2-dimensional code (step S2-1).

Using information (position information) associated with the current position and destination and optimum route information extracted from the image data (answer in step S2-2 is affirmative), the controller 25 executes a routine similar to that executed in the third embodiment to display a map with a route indicated thereon, a map of an area in the vicinity of the current position or in the vicinity of the destination, and a screen showing facility information on the display unit 31. In this fourth embodiment, unlike the third embodiment, the portable terminal 2 does not search for a route to the destination, because the optimum route information is provided by the navigation apparatus 1.

Summarizing, in the fourth embodiment, based on search data and map data stored in the storage unit 7 of the navigation apparatus 1, the navigation apparatus 1 searches for a route from a current position (parking location) to a destination. Furthermore, the navigation apparatus 1 produces a 2-dimensional code based on the thus produced optimum route information, and displays that 2-dimensional code on the display unit 23. The portable terminal 2 reads the displayed 2-dimensional code by capturing the image of the 2-dimensional code using the digital camera 32 and analyzes the image data. A map indicating the route, a map of an area in the vicinity of the current position or in the vicinity of the destination, and a screen providing facility information are displayed on the display unit 31 of the portable terminal 2.

Thus, in a case in which a user leaves his car en route to the destination, and walks or uses a public transportation system to reach the destination, the user can acquire information associated with the route, from the parking location to the destination, via the portable terminal 2, even if the portable terminal 2 does not have a position detection capability using a GPS or the like and does not have a searching capability. Further, the user does not need to operate input buttons or the like on the portable terminal 2 to input information associated with the destination, a great convenience to the user.

Fifth Embodiment

Figure 15:
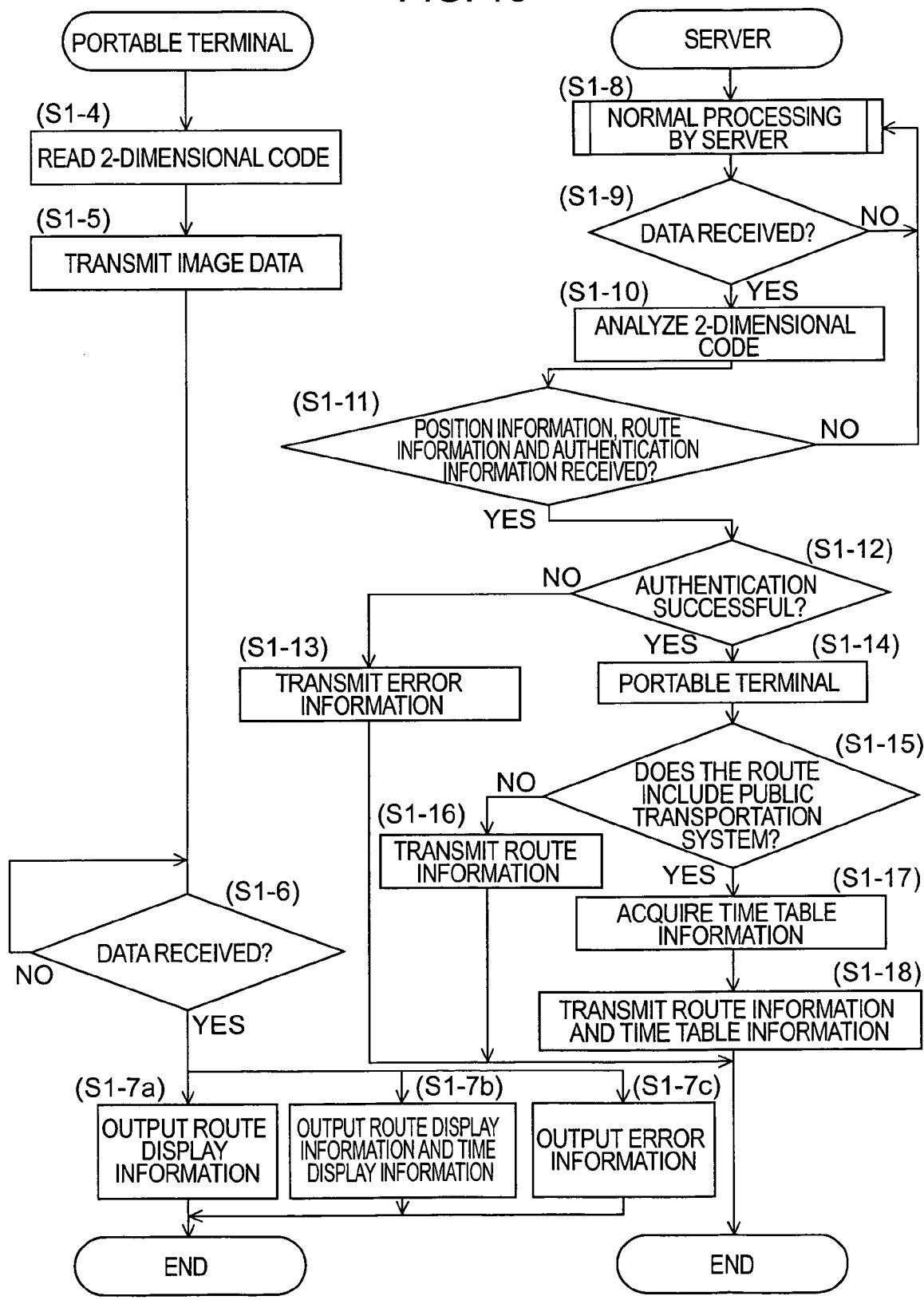
FIG. 15 is a flow chart of a routine executed in accordance with all embodiments.

A fifth embodiment of the present invention is illustrated in FIG. 15. In the fifth embodiment, the navigation apparatus 1 of the first embodiment is modified as in the fourth embodiment. In the following description of the fifth embodiment, components similar to those of the first embodiment are denoted by the same reference numerals, and the following explanation focuses on the differences from the first embodiment.

That is, in the fifth embodiment, like the fourth embodiment, the navigation apparatus 1 possesses the search capability, i.e., a capability to search the search data and map data stored in the storage unit 7 of the navigation apparatus 1. The navigation apparatus 1 searches for an optimum route and produces a 2-dimensional code including optimum route information. Thus, the server 3 does not search for an optimum route, because the searching is performed by the navigation apparatus 1.

Referring to FIG. 15, the data transmission/reception unit 37 of the server 3 analyzes the image data of the 2-dimensional code to extract position information, optimum route information, and authentication information. If the authentication information is verified as valid (the answer in step S1-12 is affirmative), the data transmission/reception unit 37 of the server 3 performs step S1-15 without execution of a search routine.

Summarizing, in the fifth embodiment, the navigation apparatus 1 searches for a route from a parking location to a destination based on the position information. Furthermore, the navigation apparatus 1 produces a 2-dimensional code based on the produced optimum route information, and the 2-dimensional code displayed on the display unit is read by portable terminal 2 by capturing the image of the 2-dimensional code using the digital camera 32 and transmits the image data to the server 3. The server 3 analyzes the received image data to extract the optimum route information. Based on the extracted optimum route information, the server 3 produces route guidance information, a map of an area in the vicinity of the current position (car parking location) or in the vicinity of the destination, and facility information and transmits the thus produced information to the portable terminal 2.

Thus, if a user leaves his car en route to the destination, and walks to or uses a public transportation system to reach the destination, the user can acquire information associated with the route, extending from the parking location to the destination, via the portable terminal 2, even if the portable terminal 2 does not have a position detection capability using a GPS or the like, does not have a route searching capability, and does not have a 2-dimensional code analysis capability. Further, the user does not need to operate input buttons or the like on the portable terminal 2 to input information associated with the destination, thus providing a great convenience to the user. The server 3 does not need to execute a searching routine, and thus the processing burden imposed on the server 3 is reduced.

Various modifications of the above-described embodiments are possible, some examples of which are described below.

Figure 16:
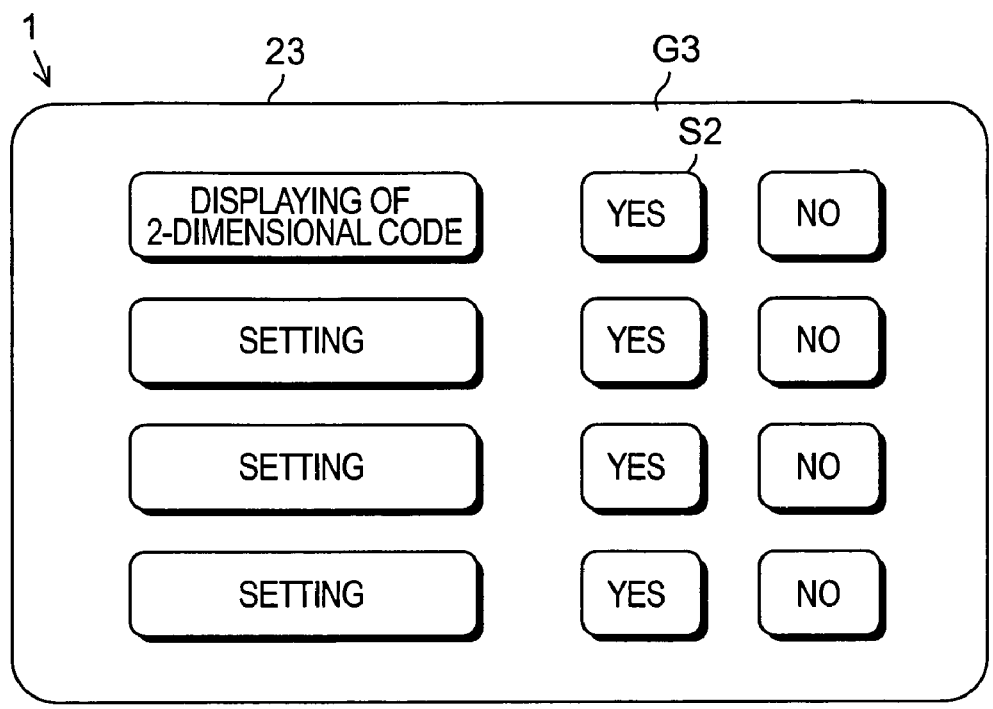
FIG. 16 shows an example of an input screen which may be displayed on the navigation apparatus in any of the foregoing embodiments.

In the embodiments described above, when a user presses a destination transfer button SI on the setting screen G1 displayed on the display unit 23 of the navigation apparatus 1, the navigation apparatus 1 responds by displaying the 2-dimensional code on the display unit 23. Alternatively, the navigation apparatus 1 may display the 2-dimensional code on the display unit 23 when the car has reached the vicinity of the destination. More specifically, if a selection button S2 corresponding to "Displaying of 2-dimensional code" on a setting screen G3 shown in FIG. 16 is pressed, the navigation apparatus 1 determines that a destination transfer command has been issued (answer in step S1-2 is affirmative). Then, the navigation apparatus 1 determines that the car has reached an area within a predetermined distance (for example, 500 m) from the destination or a departure station, the navigation apparatus 1 displays the 2-dimensional code including position information on the display unit 23.

In the embodiments described above, the code displayed on the display unit 23 of the navigation apparatus 1 is in a 2-dimensional form. Alternatively, a bar code may be used. In this case, the portable terminal captures the image of the bar code using the digital camera 32 thereby acquiring image data. The image data is analyzed by the portable terminal 2 or the server 3 to extract the information associated with the current position and the destination.

Figure 17:
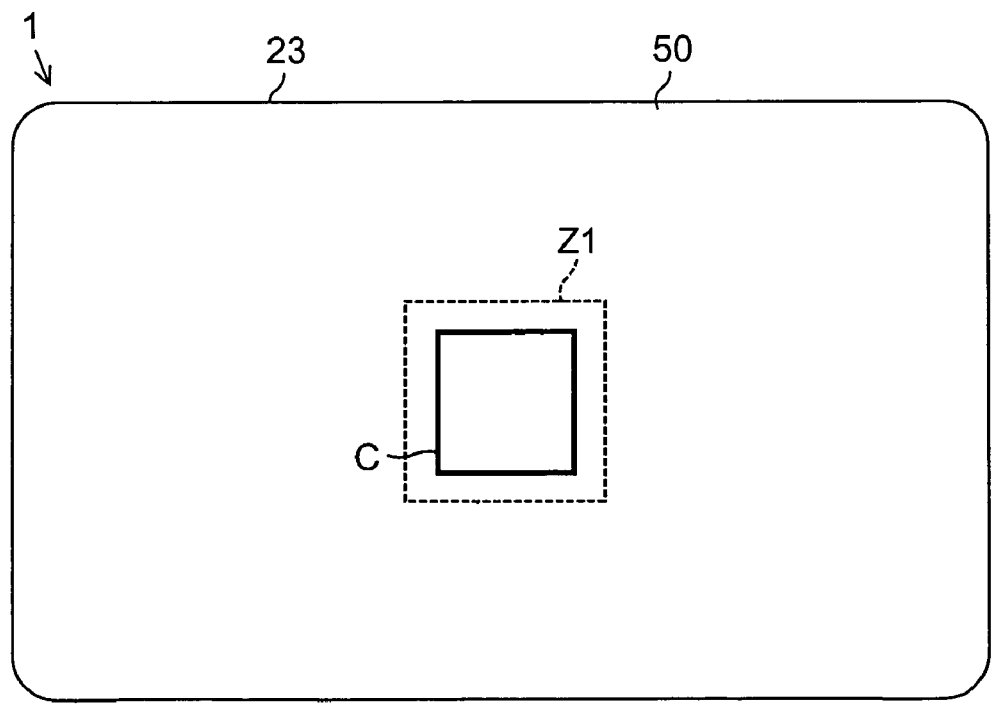
FIG. 17 shows an example of a screen display of a two-dimensional code on the navigation apparatus in all embodiments.

In the embodiments described above, only the 2-dimensional code C is displayed on the screen 50 of the display unit 23 of the navigation apparatus 1, as shown in FIG. 17. However, the 2-dimensional code C may be displayed in a display area Z1 located at the substantial center of the screen 50, as also shown in FIG. 17.

Figure 18:
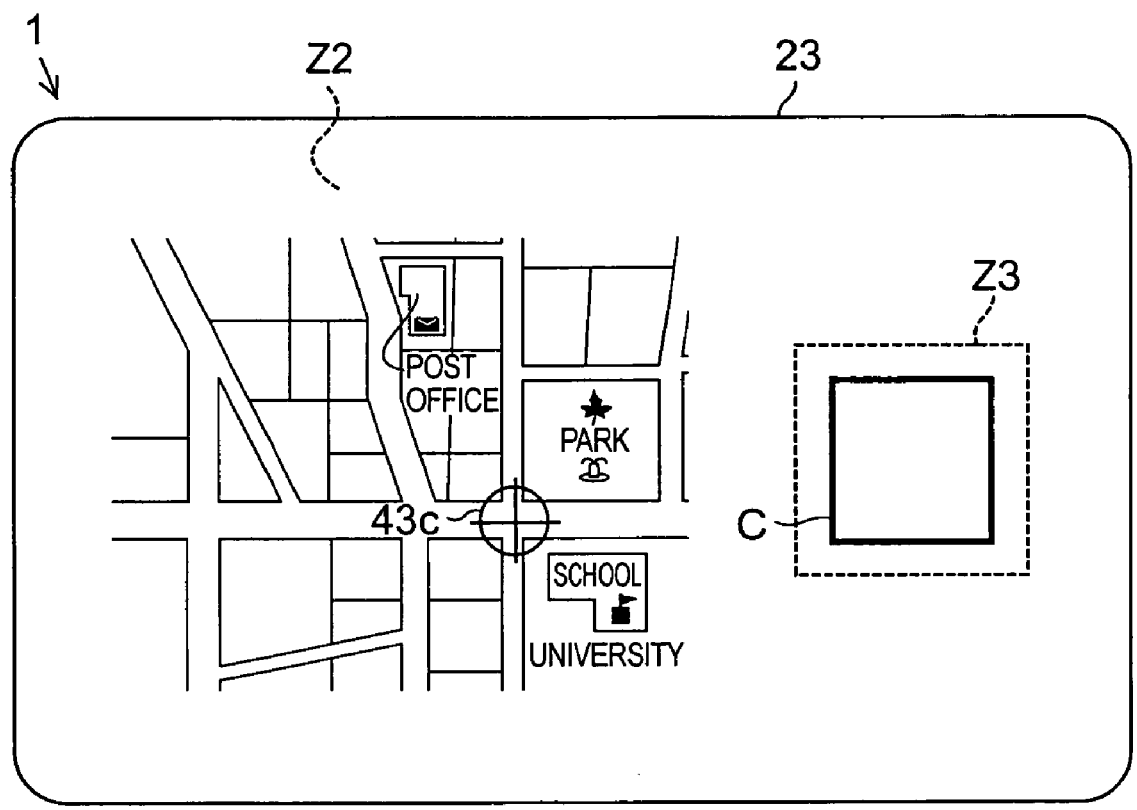
FIG. 18 shows an example of a screen display on a navigation apparatus in accordance with all embodiments.

In the embodiments described above, a screen 51 is displayed on the display unit 23 of the navigation apparatus 1 as shown in FIG. 18. However, a map of, for example, the area of the current position may be displayed in an area Z2 on the left-hand side of the screen 51, and a 2-dimensional code C may be displayed in an area Z3 on the right-hand side of the screen 51, as also shown in FIG. 18.

The first, second, and fifth embodiments may be modified so that the server 3 does not perform the search for a route or a running schedule of a transportation system.

In the embodiments described above, information associated with routes of public transportation systems, such as train systems, may be stored in the storage unit 26 of the portable terminal 2. The controller 25 of the portable terminal 2 may produce information associated with a route and schedule information for the transportation system based on the information stored in the storage unit 26.

The embodiments described above may be modified so that the 2-dimensional code produced by the navigation apparatus and read by the portable terminal 2 is analyzed by the server 3 and the resultant decoded data is returned to the portable terminal 2.

In the embodiments described above, when the portable terminal 2 accesses the server 3, the authentication process performed between the portable terminal 2 and the server 3 may be omitted. In this case, the 2-dimensional code need not include authentication information, and thus it is possible to reduce the data size of the code.

In the embodiments described above, the portable terminal 2 may have a position detection capability using a GPS or the like, and may further have a route searching capability. Even in this case, the portable terminal 2 can acquire the information associated with the destination from the navigation apparatus 1 without input of information, a feature which is very convenient for the user.

In the embodiments described above, the navigation apparatus 1 is assumed to be installed in the vehicle M, Alternatively, the navigation apparatus 1 may be a terminal installed, for example, in a store, an office, or other location.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation system comprising:
   apparatus, mounted in a vehicle, for displaying a route from a current position to a destination, comprising;
      a screen for displaying map information;
      a detector for detecting a parked location of the vehicle;
      code generation means for generating a code which includes information associated with the parked location and the destination and
   for displaying the generated code on the screen as a code display; and
   a portable terminal, carried by a user, for capturing an image of the code display on the screen and for displaying map information obtained by analyzing the code in the captured image.

2. A navigation system according to claim 1 further comprising:
   an information server, in two-way communication with the portable terminal, for transmitting the map information displayed by the portable terminal and comprising analysis means for analyzing the code in the captured image to produce the transmitted map information.

3. A guidance method for providing guidance, the guidance method comprising:
   displaying map information on a display screen of a monitor;
   generating a code for position information and displaying the code on the display screen;
   capturing, with a portable terminal which is a unit separate from the monitor, an image of the code displayed on the display screen;
   analyzing the code in the captured image to extract position information;
   producing guidance information based on the extracted information; and
   displaying the guidance information on a display screen on the portable unit.

4. A guidance method according to claim 3 wherein the analyzing of the code is executed by the portable terminal.

5. A guidance method according to claim 3 wherein the portable terminal has a digital camera and wherein the image of the encoded information is captured using the digital camera.

6. A guidance method according to claim 3 further comprising:
   transmitting a request for the guidance information from the portable terminal to an information server installed in an information center; and
   transmitting the requested guidance information from the information server to the portable terminal.

7. A guidance method according to claim 6 wherein the portable terminal executes the analyzing of the code and wherein the request for guidance information is based on the extracted information.

8. A guidance method according to claim 6 wherein the information server executes the analyzing of the code and the request for guidance information includes the code captured from the display screen.

9. A guidance system comprising:
a first screen for displaying map information;
a code generator for generating a code based on a current position and a destination and for displaying the code on the first screen as a screen display;
a portable terminal for capturing an image of the screen display and for displaying map information, based on position information, on a second screen which is on the portable terminal; and
analyzing means for analyzing the code in the captured image to extract the position information.

10. A guidance system according to claim 9 wherein the portable terminal comprises a digital camera for capturing the image of the screen display.

11. A navigation system according to claim 2 wherein the portable terminal comprises analysis means for analyzing the code in the captured image to extract position information and wherein the portable terminal transmits the extracted information to the information server for use in generation, by the information server, of the map information displayed by the portable terminal.

12. A navigation system according to claim 1 wherein the portable terminal comprises a digital camera for capturing the image of the code display.

13. A navigation system according to claim 1 wherein the code display appears in a window on a map information display screen.

14. A guidance system according to claim 9 wherein the analysis means is incorporated into the portable terminal.

15. A guidance system according to claim 9 further comprising an information server in two-way communication with the portable terminal, wherein the analysis means is incorporated into the information server.

16. A guidance method according to claim 3, further comprising a step, performed by an information server in two-way communication with the portable terminal, for receiving image information produced from the captured image of the code and a step for extracting information associated with the current position and the destination by analyzing the received image information.

17. A guidance method according to claim 3, further comprising a step, performed by an information server, for searching for a route from the current position to the destination based on the extracted information associated with the current position and the destination, and a step for transmitting information associated with the route determined by said searching.

18. A guidance method according to claim 3, further comprising a step, performed by the portable terminal, for searching for a route from the current position to the destination based on the extracted information associated with the current position and the destination.

19. A guidance method according to claim 16, further comprising a step, performed by the navigation apparatus, for searching for a route from the current position to the destination based on the information associated with the current position and the destination, and incorporating information associated with the route determined by said searching into the code.

20. A guidance method according to claim 3, further comprising a step, performed by a navigation apparatus including the monitor, for searching for a route from the current position to the destination based on information associated with the current position and the destination, and incorporating information associated with the route determined by said searching into the code.

21. A guidance method according to claim 3, further comprising a step, performed by an information server in two-way communication with the portable terminal, for producing information for a route or a running schedule of a transportation system based on the extracted information associated with the current position and the destination and a step for transmitting the produced information for the route or the running schedule of the transportation system to the portable terminal.

22. A guidance method according to claim 3, further comprising a step, performed by the portable terminal or an information server in two-way communication with the portable terminal via a two-way communication line, for transmitting facility information associated with the current position or facility information associated with the destination to the portable terminal, based on the extracted information associated with the current position and the destination.

* * * * *